(12) United States Patent
Caudy et al.

(10) Patent No.: US 10,241,965 B1
(45) Date of Patent: Mar. 26, 2019

(54) COMPUTER DATA DISTRIBUTION ARCHITECTURE CONNECTING AN UPDATE PROPAGATION GRAPH THROUGH MULTIPLE REMOTE QUERY PROCESSORS

(71) Applicant: Deephaven Data Labs LLC, Plymouth, MN (US)

(72) Inventors: Ryan Caudy, New York, NY (US); David R. Kent, IV, Colorado Springs, CO (US); Charles Wright, Cortlandt Manor, NY (US); Brian Ries, St. Louis Park, MN (US); Radu Teodorescu, New York, NY (US)

(73) Assignee: Deephaven Data Labs LLC, Plymouth, MN (US)

( * ) Notice: Subject to any disclaimer, the term of this patent is extended or adjusted under 35 U.S.C. 154(b) by 0 days.

(21) Appl. No.: 15/813,127

(22) Filed: Nov. 14, 2017

Related U.S. Application Data

(60) Provisional application No. 62/549,908, filed on Aug. 24, 2017.

(51) Int. Cl.
| | | |
|---|---|---|
| *G06F 17/30* | (2006.01) | |
| *G06F 16/903* | (2019.01) | |
| *G06F 16/23* | (2019.01) | |
| *G06F 16/11* | (2019.01) | |
| *G06F 16/901* | (2019.01) | |

(52) U.S. Cl.
CPC ...... *G06F 16/90335* (2019.01); *G06F 16/128* (2019.01); *G06F 16/23* (2019.01); *G06F 16/901* (2019.01)

(58) Field of Classification Search
CPC ......... G06F 17/30979; G06F 17/30002; G06F 17/30088; G06F 17/30946

USPC ........................................................ 707/755
See application file for complete search history.

(56) References Cited

U.S. PATENT DOCUMENTS

| | | |
|---|---|---|
| 5,335,202 A | 8/1994 | Manning et al. |
| 5,452,434 A | 9/1995 | Macdonald |
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,428 A | 7/1998 | Hart |

(Continued)

FOREIGN PATENT DOCUMENTS

| | | |
|---|---|---|
| CA | 2309462 A1 | 12/2000 |
| EP | 1406463 A2 | 4/2004 |

(Continued)

OTHER PUBLICATIONS

International Search Report and Written Opinion dated Aug. 18, 2016, in International Appln. No. PCT/US2016/032593 filed May 14, 2016.

(Continued)

*Primary Examiner* — Grace Park
(74) *Attorney, Agent, or Firm* — Carmichael IP, PLLC

(57) ABSTRACT

Described are methods, systems and computer readable media for computer data distribution architecture connecting an update propagation graph through multiple remote query processors.

20 Claims, 13 Drawing Sheets

(56) References Cited

U.S. PATENT DOCUMENTS

| | | |
|---|---|---|
| 5,806,059 A | 9/1998 | Tsuchida et al. |
| 5,859,972 A | 1/1999 | Subramaniam et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,160,548 A | 12/2000 | Lea et al. |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,099,927 B2 | 8/2006 | Cudd et al. |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 | 3/2009 | McClain et al. |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,747,640 B2 | 6/2010 | Dettinger et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |

(56) References Cited

U.S. PATENT DOCUMENTS

| | | |
|---|---|---|
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Acutia et al. |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent et al. |
| 9,633,060 B2 | 4/2017 | Gaudy et al. |
| 9,639,570 B2 | 5/2017 | Wright et al. |
| 9,672,238 B2 | 6/2017 | Wright et al. |
| 9,679,006 B2 | 6/2017 | Wright et al. |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 | 10/2017 | Wright et al. |
| 9,832,068 B2 | 11/2017 | McSherry et al. |
| 9,836,494 B2 | 12/2017 | Caudy et al. |
| 9,836,495 B2 | 12/2017 | Wright |
| 9,886,469 B2 | 2/2018 | Kent et al. |
| 9,898,496 B2 | 2/2018 | Caudy et al. |
| 9,934,266 B2 | 4/2018 | Wright et al. |
| 10,002,153 B2 | 6/2018 | Teodorescu et al. |
| 10,002,154 B1 | 6/2018 | Kent et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kanai et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0076155 A1 | 4/2004 | Yajnik et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0165866 A1 | 7/2005 | Bohannon et al. |
| 2005/0198001 A1 | 9/2005 | Cunningham et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0116287 A1 | 5/2007 | Rasizade et al. |
| 2007/0169003 A1 | 7/2007 | Branda et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |

(56) References Cited

U.S. PATENT DOCUMENTS

| | | |
|---|---|---|
| 2008/0072150 A1 | 3/2008 | Chan et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0271472 A1 | 10/2009 | Scheifler et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0314019 A1 | 12/2011 | Peris |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0040203 A1 | 2/2014 | Lu et al. |
| 2014/0059646 A1 | 2/2014 | Hannel et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0292765 A1 | 10/2014 | Maruyama et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0359574 A1 | 12/2014 | Beckwith et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Dally |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2015/0356157 A1 | 12/2015 | Anderson et al. |
| 2016/0026442 A1 | 1/2016 | Chhaparia |
| 2016/0065670 A1 | 3/2016 | Kimmel et al. |
| 2016/0092599 A1 | 3/2016 | Barsness et al. |
| 2016/0125018 A1 | 5/2016 | Tomoda et al. |
| 2016/0171070 A1 | 6/2016 | Hrle et al. |
| 2016/0179754 A1 | 6/2016 | Borza et al. |
| 2016/0253294 A1 | 9/2016 | Allen et al. |
| 2016/0316038 A1 | 10/2016 | Jolfaei |
| 2016/0335281 A1 | 11/2016 | Teodorescu et al. |
| 2016/0335304 A1 | 11/2016 | Teodorescu et al. |
| 2016/0335317 A1 | 11/2016 | Teodorescu et al. |
| 2016/0335323 A1 | 11/2016 | Teodorescu et al. |
| 2016/0335330 A1 | 11/2016 | Teodorescu et al. |
| 2016/0335361 A1 | 11/2016 | Teodorescu et al. |
| 2017/0161514 A1 | 6/2017 | Dettinger et al. |
| 2017/0177677 A1 | 6/2017 | Wright et al. |
| 2017/0185385 A1 | 6/2017 | Kent et al. |
| 2017/0192910 A1 | 7/2017 | Wright et al. |
| 2017/0206229 A1 | 7/2017 | Caudy et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0359415 A1 | 12/2017 | Venkatraman et al. |
| 2018/0004796 A1 | 1/2018 | Kent et al. |

(56) References Cited

U.S. PATENT DOCUMENTS

| | | | |
|---|---|---|---|
| 2018/0011891 A1 | 1/2018 | Wright et al. | |
| 2018/0052879 A1 | 2/2018 | Wright | |
| 2018/0137175 A1 | 5/2018 | Teodorescu et al. | |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |

OTHER PUBLICATIONS

International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Jellema, Lucas. "Implemeting Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).
Kramer, The Combining DAG: A Technique for Parallel Data Flow Analysis, IEEE Transactions on Parallel and Distributed Systems, vol. 5, No. 8, Aug. 1994, pp. 805-813.
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Mallet, "Relational Database Support for Spatia-Temporal Data", Technical Report TR 04-21, Sep. 2004, University of Alberta, Department of Computing Science.
Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action dated Apr. 19, 2017, in U.S. Appl. No. 15/154,974.
Non-final Office Action dated Aug. 12, 2016, in U.S. Appl. No. 15/155,001.
Non-final Office Action dated Aug. 14, 2017, in U.S. Appl. No. 15/464,314.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.
Non-final Office Action dated Aug. 8, 2016, in U.S. Appl. No. 15/154,981.
Non-final Office Action dated Aug. 8, 2016, in U.S. Appl. No. 15/154,985.
Non-final Office Action dated Dec. 13, 2017, in U.S. Appl. No. 15/608,963.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Feb. 12, 2018, in U.S. Appl. No. 15/466,836.
Non-final Office Action dated Feb. 8, 2017, in U.S. Appl. No. 15/154,997.
Non-final Office Action dated Jan. 4, 2018, in U.S. Appl. No. 15/583,777.
Non-final Office Action dated Jul. 27, 2017, in U.S. Appl. No. 15/154,995.
Non-final Office Action dated Mar. 2, 2017, in U.S. Appl. No. 15/154,984.
Non-final Office Action dated Nov. 15, 2017, in U.S. Appl. No. 15/654,461.

(56) References Cited

OTHER PUBLICATIONS

Non-final Office Action dated Nov. 17, 2016, in U.S. Appl. No. 15/154,999.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 13, 2016, in U.S. Appl. No. 15/155,009.
Non-final Office Action dated Oct. 27, 2016, in U.S. App. No. 15/155,006.
Non-final Office Action dated Oct. 5, 2017, in U.S. Appl. No. 15/428,145.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 12, 2018, in U.S. Appl. No. 15/813,142.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.
Notice of Allowance dated Nov. 17, 2016, in U.S. Appl. No. 15/154,991.
Notice of Allowance dated Nov. 17, 2017, in U.S. Appl. No. 15/154,993.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Notice of Allowance dated Oct. 6, 2017, in U.S. Appl. No. 15/610,162.
Palpanas, Themistoklis et al. "Incremental Maintenance for Non-Distributive Aggregate Functions", Proceedings of the 28th VLDB Conference, 2002. Retrieved from http://www.vldb.org/conf/2002/S22P04.pdf.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable Sparql Querying using Path Partitioning", 31st IEEE International Conference on Data Engineering (ICDE 2015), Seoul, Korea, Apr. 13-17, 2015. Retrieved from http://imada.sdu.dk/~zhou/papers/icde2015.pdf.
"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
"Change Data Capture", Oracle Database Online Documentation 11g Release 1 (11.1), dated Apr. 5, 2016. Retrieved from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retrieved from http://public.dhe.ibm.com/ps/products/db2/info/vr95/pdf/en_US/DB2PerfTuneTroubleshoot-db2d3e953.pdf.
"GNU Emacs Manual", dated Apr. 15, 2016, pp. 43-47. Retrieved from https://web.archive.org/web/20160415175915/http://www.gnu.org/software/emacs/manual/html_mono/emacs.html.
"Google Protocol RPC Library Overview", dated Apr. 27, 2016. Retrieved from https://cloud.google.com/appengine/docs/python/tools/protorpc/ (last accessed Jun. 16, 2016).
"IBM —What is HBase?", dated Sep. 6, 2015. Retrieved from https://web.archive.org/web/20150906022050/http://www-01.ibm.com/software/data/infosphere/hadoop/hbase/.
"IBM Informix TimeSeries data management", dated Jan. 18, 2016. Retrieved from https://web.archive.org/web/20160118072141/http://www-01.ibm.com/software/data/informix/timeseries/.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.

(56) References Cited

OTHER PUBLICATIONS

"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Sophia Database—Architecture", dated Jan. 18, 2016. Retrieved from https://web.archive.org/web/20160118052919/http://sphia.org/architecture.html.
"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.
"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Advisory Action dated Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Dec. 21, 2017, in U.S. Appl. No. 15/154,984.
Advisory Action dated Mar. 31, 2017, in U.S. Appl. No. 15/154,996.
Advisory Action dated May 3, 2017, in U.S. Appl. No. 15/154,993.
Borror, Jefferey A. "Q for Mortals 2.0", dated Nov. 1, 2011. Retreived from http://code.kx.com/wiki/JB:QforMortals2/contents.
Breitbart, Update Propagation Protocols for Replicated Databases, SIGMOD '99 Philadelphia PA, 1999, pp. 97-108.
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request mailed Nov. 20, 2017, in U.S. Appl. No. 15/154,997.
Ex Parte Quayle Action mailed Aug. 8, 2016, in U.S. Appl. No. 15/154,999.
Final Office Action dated Apr. 10, 2017, in U.S. Appl. No. 15/155,006.
Final Office Action dated Dec. 19, 2016, in U.S. Appl. No. 15/154,995.
Final Office Action dated Dec. 29, 2017, in U.S. Appl. No. 15/154,974.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Final Office Action dated Jul. 27, 2017, in U.S. Appl. No. 15/154,993.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 4, 2017, in U.S. Appl. No. 15/155,009.
Gai, Lei et al. "An Efficient Summary Graph Driven Method for RDF Query Processing", dated Oct. 27, 2015. Retreived from http://arxiv.org/pdf/1510.07749.pdf.
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
Final Office Action dated Aug. 10, 2018, in U.S. Appl. No. 15/796,230.
Final Office Action dated Aug. 2, 2018, in U.S. Appl. No. 15/154,996.
Final Office Action dated Aug. 28, 2018, in U.S. Appl. No. 15/813,119.
Final Office Action dated Jun. 18, 2018, in U.S. Appl. No. 15/155,005.
Final Office Action dated May 18, 2018, in U.S. Appl. No. 15/654,461.
Non-final Office Action dated Apr. 12, 2018, in U.S. Appl. No. 15/154,997.
Non-final Office Action dated Apr. 5, 2018, in U.S. Appl. No. 15/154,984.
Non-final Office Action dated Aug. 10, 2018, in U.S. Appl. No. 16/004,578.
Non-final Office Action dated Jun. 29, 2018, in U.S. Appl. No. 15/154,974.
Non-final Office Action dated Jun. 8, 2018, in U.S. Appl. 15/452,574.
Notice of Allowance dated Apr. 30, 2018, in U.S. Appl. No. 15/155,012.
Notice of Allowance dated Jul. 11, 2018, in U.S. Appl. No. 15/154,995.
Notice of Allowance dated May 4, 2018, in U.S. Appl. No. 15/897,547.
Notice of Allowance dated Sep. 11, 2018, in U.S. Appl. No. 15/608,961.
Non-final Office Action dated Feb. 15, 2018, in U.S. Appl. No. 15/813,112.
Non-final Office Action dated Feb. 28, 2018, in U.S. Appl. No. 15/813,119.
Non-final Office Action dated Mar. 20, 2018, in U.S. Appl. No. 15/155,006.
Notice of Allowance dated Feb. 26, 2018, in U.S. Appl. No. 15/428,145.
Notice of Allowance dated Mar. 1, 2018, in U.S. Appl. No. 15/464,314.

COMPUTER DATA DISTRIBUTION ARCHITECTURE CONNECTING AN UPDATE PROPAGATION GRAPH THROUGH MULTIPLE REMOTE QUERY PROCESSORS

This application claims the benefit of U.S. Provisional Application No. 62/549,908, entitled "COMPUTER DATA SYSTEM" and filed on Aug. 24, 2017, which is incorporated herein by reference in its entirety.

Embodiments relate generally to computer data systems, and more particularly, to methods, systems and computer readable media for computer data distribution architecture connecting an update propagation graph through multiple remote query processors.

Some conventional computer data systems may maintain data in one or more data sources that may include data objects such as tables. These conventional systems may include clients that access tables from each data source to execute queries. In such data systems, a need may exist to provide systems and methods for executing dynamically changing queries as a directed acyclic graph connected through multiple clients, in order to reduce memory usage of an individual client and to enable redundancy, high-availability, scalability, and allow parallelization of queries across multiple clients.

Embodiments were conceived in light of the above mentioned needs, problems and/or limitations, among other things.

Some implementations (first implementations) include a computer database system that includes one or more processors and computer readable storage coupled to the one or more processors. The computer readable storage can have stored thereon instructions that, when executed by the one or more processors, cause the one or more processors to perform operations. The operations can include receiving a query. The operations can also include parsing the query and in response to said parsing creating a query graph based on the query. The operations can further include assigning a first sub-graph of the query graph to a first query processor. The operations can also include assigning a second sub-graph of the query graph to a second query processor, a result of the first sub-graph being an input to the second sub-graph. The operations can further include creating, at the second query processor, an object to represent a replica of the result of the first sub-graph from the first query processor. The operations can also include sending a subscription request from the second query processor to the first query processor to receive consistent updates to the result of the first sub-graph. The operations can further include receiving, at the second query processor, an initial snapshot of the result from the first query processor. The operations can also include storing the initial snapshot as the replica of the result. The operations can further include assigning the replica of the result as an input to the second sub-graph at the second query processor. The operations can also include adding at the first query processor a first listener to the first sub-graph as a dependent of the result. The operations can further include receiving, at the first listener, an update notification indicating an update to the result. The operations can also include sending, by the first listener, a notification to the second query processor including an indication of the change to the result and a copy of any changed data. The operations can further include, responsive to receiving the notification at the second query processor, updating the replica of the result and propagating the changes through the second sub-graph at the second query processor. The operations can also include determining a current output of the query graph based on an output of the second sub-graph.

In some first implementations, the query graph is a directed acyclic graph. In some first implementations, the first and second sub-graphs are directed acyclic graphs. In some first implementations, the update notification includes at least one selected from a group consisting of a data add notification, a data modify notification, a data delete notification and a data reindex notification. In some first implementations, the notification includes at least one selected from a group consisting of a data add notification, a data modify notification, a data delete notification and a data reindex notification.

Some implementations (second implementations) include a method that can include assigning a first sub-graph of a query graph to a first query processor. The method can also include assigning a second sub-graph of the query graph to a second query processor, a result of the first sub-graph being an input to the second sub-graph. The method can further include creating, at the second query processor, an object to represent a replica of the result of the first sub-graph from the first query processor. The method can also include sending a subscription request from the second query processor to the first query processor to receive consistent updates to the result of the first sub-graph. The method can further include assigning the replica of the result as an input to the second sub-graph at the second query processor. The method can also include adding at the first query processor a first listener to the first sub-graph as a dependent of the result. The method can further include receiving, at the first listener, an update notification indicating an update to the result. The method can also include sending, by the first listener, a notification to the second query processor including an indication of the change to the result and a copy of any changed data. The method can further include, responsive to receiving the notification at the second query processor, updating the replica of the result and propagating the changes through the second sub-graph at the second query processor. The method can also include determining a current output of the query graph based on an output of the second sub-graph.

In some second implementations, the method further includes receiving a query, parsing the query, and in response to the parsing creating the query graph based on the query. In some second implementations, the method further includes receiving, at the second query processor, an initial snapshot of the result from the first query processor, the initial snapshot being sent in response to the subscription request, and storing the initial snapshot as the replica of the result.

In some second implementations, the query graph is a directed acyclic graph. In some second implementations, the first and second sub-graphs are directed acyclic graphs. In some second implementations, the update notification includes at least one selected from a group consisting of a data add notification, a data modify notification, a data delete notification and a data reindex notification. In some second implementations, the notification includes at least one selected from a group consisting of a data add notification, a data modify notification, a data delete notification and a data reindex notification.

Some implementations (third implementations) include a nontransitory computer readable medium having stored thereon software instructions that, when executed by one or more processors, cause the one or more processors to perform operations. The operations can include creating, at the second query processor, an object to represent a replica of the result of the first sub-graph from the first query processor. The operations can also include sending a subscription request from the second query processor to the first query processor to receive consistent updates to the result of the first sub-graph. The operations can further include assigning the replica of the result as an input to the second sub-graph at the second query processor. The operations can also include adding at the first query processor a first listener to the first sub-graph as a dependent of the result. The operations can further include receiving, at the first listener, an update notification indicating an update to the result. The operations can also include sending, by the first listener, a notification to the second query processor including an indication of the change to the result and a copy of any changed data. The operations can further include responsive to receiving the notification at the second query processor, updating the replica of the result and propagating the changes through the second sub-graph at the second query processor. The operations can also include determining a current output of the query graph based on an output of the second sub-graph.

In some third implementations, the operations also include assigning a first sub-graph of a query graph to a first query processor, and assigning a second sub-graph of the query graph to a second query processor, where a result of the first sub-graph is an input to the second sub-graph. In some third implementations, the operations further include receiving a query, parsing the query, and in response to the parsing creating the query graph based on the query. In some third implementations, the operations also include receiving, at the second query processor, an initial snapshot of the result from the first query processor, the initial snapshot being sent in response to the subscription request, and storing the initial snapshot as the replica of the result.

In some third implementations, the query graph is a directed acyclic graph. In some third implementations, the first and second sub-graphs are directed acyclic graphs. In some third implementations, the update notification includes at least one selected from a group consisting of a data add notification, a data modify notification, a data delete notification and a data reindex notification. In some third implementations, the notification includes at least one selected from a group consisting of a data add notification, a data modify notification, a data delete notification and a data reindex notification.

DETAILED DESCRIPTION

Reference may be made herein to the Java programming language, Java classes, Java bytecode and the Java Virtual Machine (JVM) for purposes of illustrating example implementations. It will be appreciated that implementations can include other programming languages (e.g., groovy, Scala. R. Go. etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
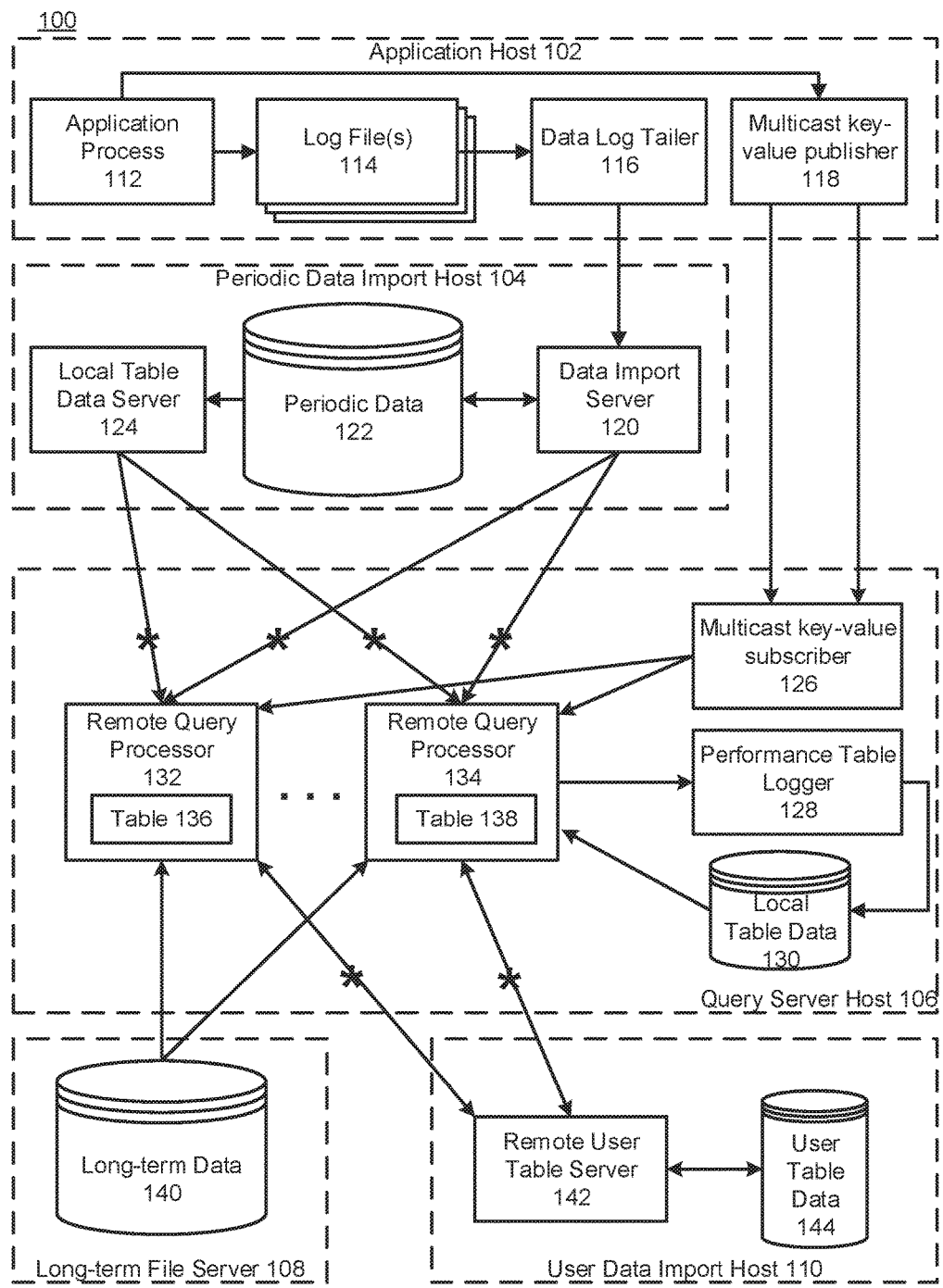
FIG. 1 is a diagram of an example computer data system showing an example data distribution configuration, in accordance with some implementations.
Figure 2:
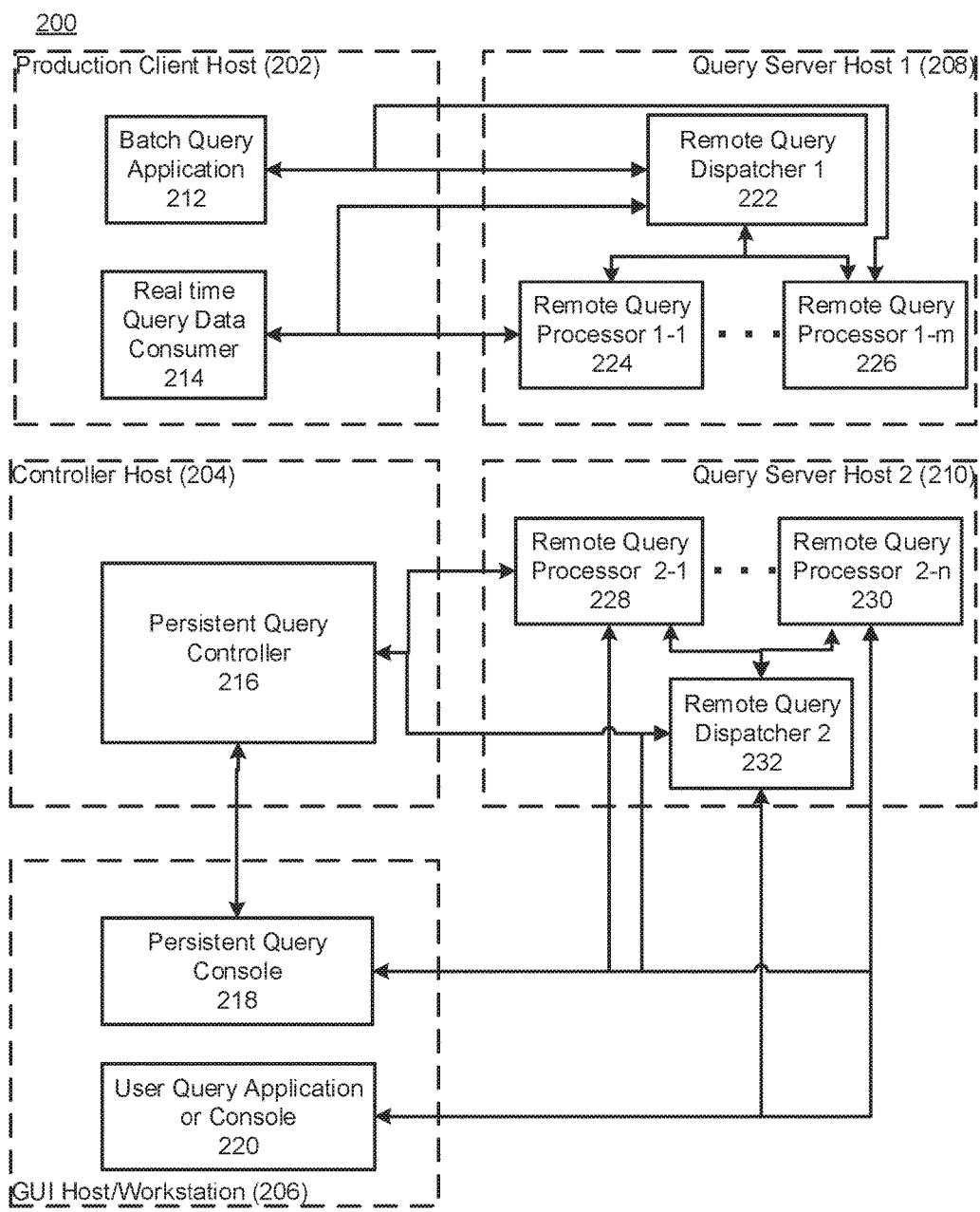
FIG. 2 is a diagram of an example computer data system showing an example administration/process control arrangement, in accordance with some implementations.

FIG. 1 is a diagram of an example computer data system and network 100X) showing an example data distribution configuration in accordance with some implementations. In particular, the system 100 includes an application host 102, a periodic data import host 104. a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object is can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol. the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

Figure 3:
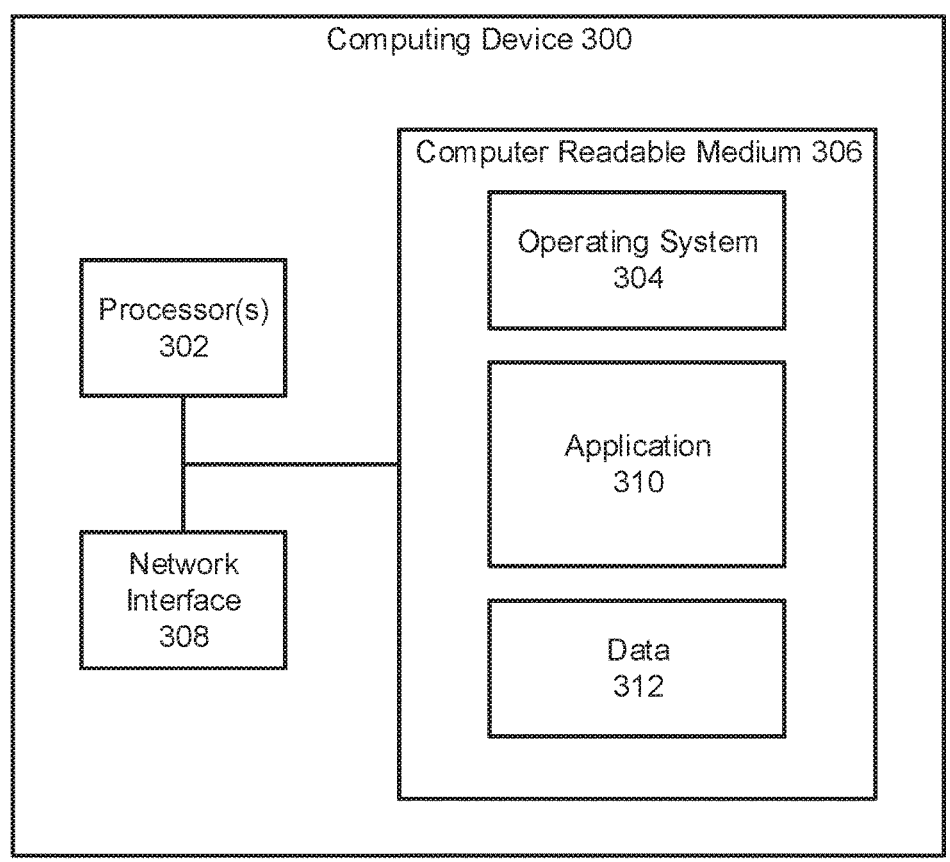
FIG. 3 is a diagram of an example computing device configured for connecting query directed acyclic graphs (DAGs) through multiple remote query processors, in accordance with at least one implementation.
Figure 4:
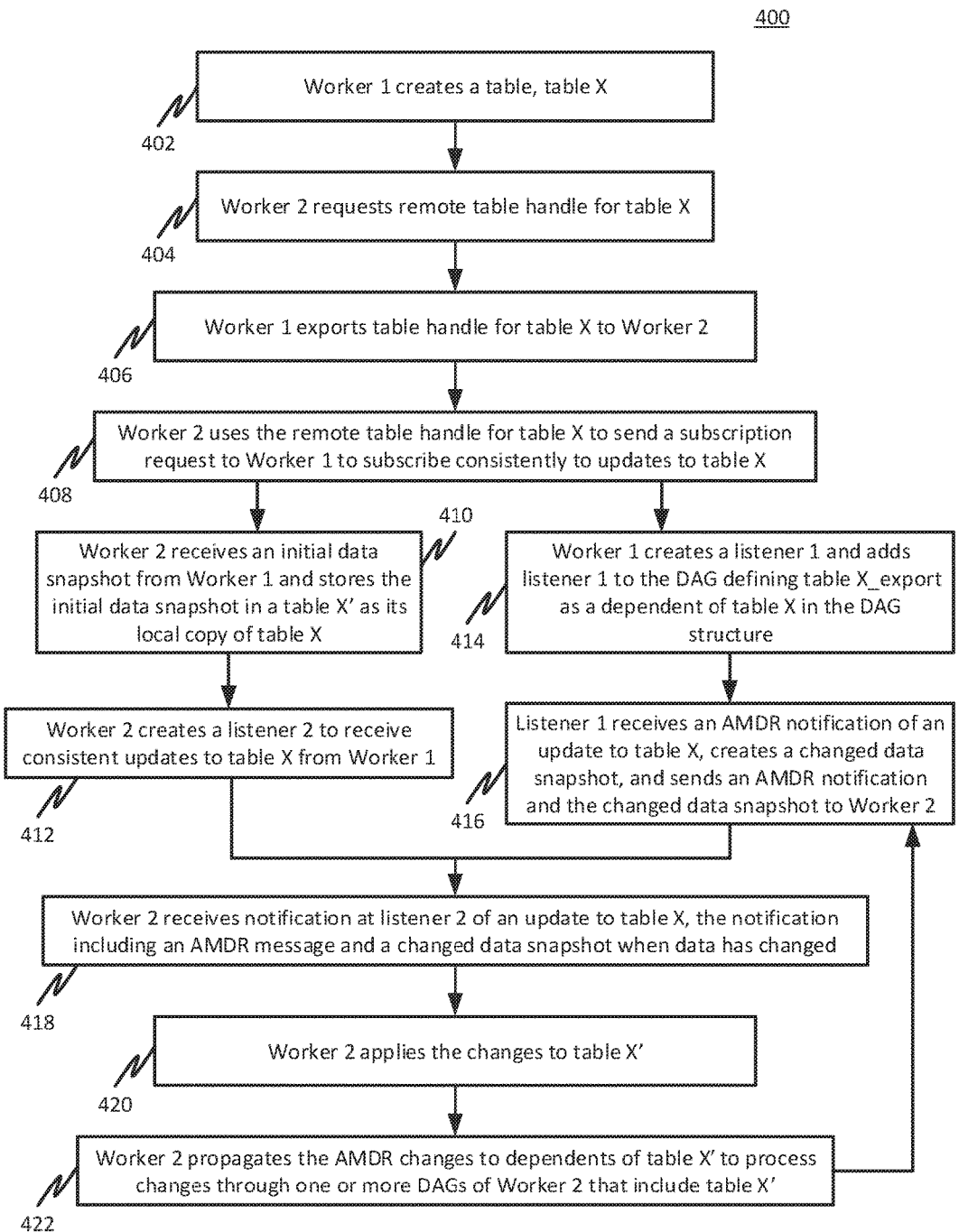
FIG. 4 is a flowchart of an example method of connecting a query DAG through multiple remote query processors, in accordance with some implementations.

The local table data server 124 can be configured to retrieve data stored in the periodic table data store 122 and provide the retrieved data to one or more remote query processors (132, 134) via an optional proxy (e.g., table data cache proxy (TDCP) 394 and/or 404 as shown in FIG. 3 and FIG. 4, respectively). Remote query processors (132, 134) can also receive data from DIS 120 and/or LTDS 124 via the proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS, for example.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors (e.g., table data cache proxy (TDCP) 392 or 404 as shown in FIG. 3B and FIG. 4, respectively). Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries.

For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped. etc. This can be done manually, or by scheduled (e.g., cron jobs). Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

FIG. 3 is a diagram of an example computing device 300 configured for connecting query directed acyclic graphs ("DAGs") through multiple remote query processors in accordance with at least one implementation. The computing device 300 includes one or more processors 302, operating system 304, computer readable medium 306 and network interface 308. The memory 306 can include connected DAG application 310 and a data section 312 (e.g., for storing caches, index data structures, column source maps, etc.).

In operation, the processor 302 may execute the application 310 stored in the memory 306. The application 310 can include software instructions that, when executed by the processor, cause the processor to perform operations for connecting query directed acyclic graphs through multiple remote query processors in accordance with the present disclosure (e.g., performing one or more of 402-422, 902-910, 1002-1024, and/or 1102-1122 described below).

The application program 310 can operate in conjunction with the data section 312 and the operating system 304.

Figure 5A:
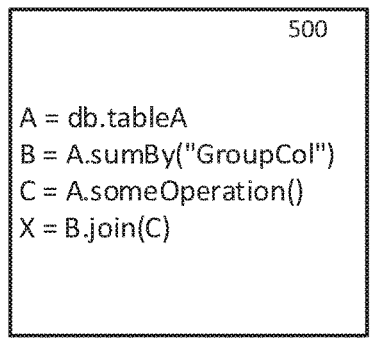
FIGS. 5A and 5B show data source definitions and a corresponding DAG, in accordance with some implementations.

FIG. 4 is a flowchart of an example method 400 of connecting a query DAG through multiple remote query processors in accordance with some implementations. Processing begins at 402, where worker 1 creates a table, table X. For example, table X can be created as a join of two tables, B and C, each of which is a result of an operation on the same parent table, table A, as shown in FIG. 5A. Processing continues to 404.

At 404, worker 2 requests a remote table handle for table X. Processing continues to 406.

At 406, worker 1 exports table handle for table X (e.g., X_export shown in FIG. 5C) to worker 2. Processing continues to 408.

At 408. worker 2 uses the remote table handle for table X to send a subscription request to Worker 1 to subscribe consistently to updates to table X. Processing continues to 410 and/or 414.

At 410, worker 2 receives an initial data snapshot from worker 1 and stores the initial data snapshot in a table X' (e.g., table X' in FIG. 5C) as its local copy of table X. In some embodiments, worker 1 can create the data snapshot for transmission to worker 2 using method 1000 shown in FIG. 10 and described herein below. Processing continues to 412.

At 412, worker 2 creates a listener 2 to receive consistent updates to table X from worker 1 (e.g., although not shown. X' in FIG. 5C can include a listener such as listener 2). Processing continues to 418.

Figure 5B:
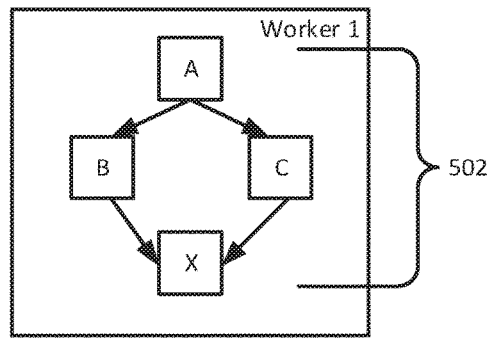
Figure 5C:
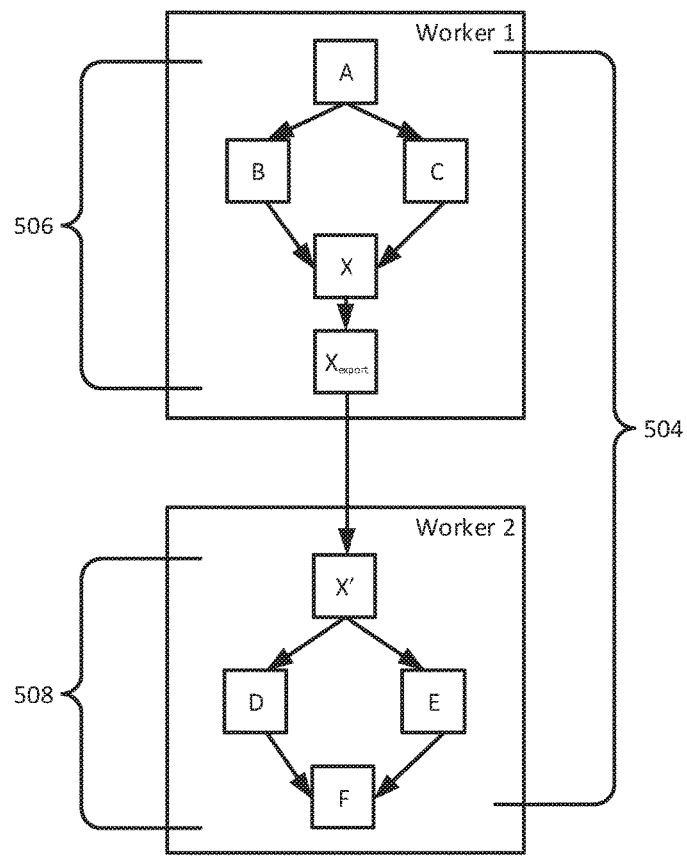
FIG. 5C is a diagram illustrating a DAG connected through two workers, in accordance with some implementations.

At 414, worker 1 creates a listener 1 and adds listener 1 to the DAG defining table X_export as a dependent of table X in the DAG structure (e.g., although not shown, X_export in FIG. 5C can include a listener such as listener 1). Processing continues to 416.

At 416, listener 1 receives an AMDR notification of an update to table X, creates a changed data snapshot, and sends an AMDR notification and the changed data snapshot to worker 2. Processing continues to 418.

At 418, worker 2 receives notification at listener 2 of an update to table X, the notification including an AMDR message and a changed data snapshot when data has changed. Processing continues to 420.

At 420, worker 2 applies the changes to table X'. Processing continues to 422.

At 422, worker 2 propagates the AMDR changes to dependents of table X' (e.g., tables D and E shown in FIG. 5C) to process changes through one or more DAGs of worker 2 that include table X'. In some embodiments, worker 2 uses a locking mechanism when performing 418, 420, and 422 to ensure that changes are applied to table X' and its dependents in a consistent manner, as shown for example, in FIG. 9.

It will be appreciated that, although not shown, the subscribing worker 2 can cancel their subscription to stop receiving updates from worker 1, and that the TDCP may cancel its own data subscriptions and/or discard data it no longer needs for any RQP.

It will also be appreciated that 402-422 may be repeated in whole or in part. For example, 416-422 may be repeated to propagate updates through the DAGs of worker 1 and worker 2.

FIGS. 5A and 5B show data source definitions and a corresponding directed acyclic graph query (DAG) in accordance with some implementations. In FIG. 5A, example code 500 defines the data sources as tables (A, B, C, and X). From the code 500 for the data sources, DAG 502 can be generated as shown by the graph in FIG. 5B. DAG 502 in FIG. 5B shows dependencies between the nodes, which correspond to table data sources.

Although the DAG in FIG. 5B includes only four nodes, DAGs can be generated with more nodes in various configurations. For example, FIGS. 6A, 6B, 7, and 8 also show data source definitions and a corresponding directed acyclic graph (DAG) in accordance with some implementations. In FIG. 5A, example code defines the data sources as tables (A, B. C, and X), where A is a primary data source. From the code for the data sources, a DAG can be generated as shown by the graph in FIG. 5B. The DAG in FIG. 5B shows dependencies between the nodes, which correspond to table relationships defined in FIG. 5A.

Data sources can include market data (e.g., data received via multicast distribution mechanism or through a tailer), system generated data, historical data, user input data from the remote user table server, tables programmatically generated in-memory, or something further upstream in the DAG. In general, anything represented in the data system as an object (e.g., a table) and which can refresh itself/provide data can be a data source. Also, data sources can include non-table data structures which update, for example, mathematical data structures. As shown in FIG. 5A, B=A.sumBy ("GroupCol"), where this creates a summation aggregation of table A as a new table B. The table B would then get updated when A changes as shown, for example, in FIGS. 9A-9E and 12 of U.S. patent application Ser. No. 15/351, 429, entitled "QUERY TASK PROCESSING BASED ON MEMORY ALLOCATION AND PERFORMANCE CRI- TERIA" and filed on Nov. 14, 2016 (hereinafter the '429 application), which is hereby incorporated by reference herein in its entirety as if fully set forth herein. Similarly, minimum, maximum, variance, average, standard deviation, first, last, by, etc. aggregations can be supported, as shown, for example, in FIG. 14B of the '429 application, t5=t4.stdBy("GroupCol"), where this creates a standard deviation aggregation of table t4 as a new table t5.

In some implementations, code can be converted into the in-memory data structures holding the DAG. For example, the source code of FIG. 5A gets converted into the DAG data structure in memory. The DAG connectivity can change by executing code. For example, assume a set of code CODE1 is executed. CODE1 leads to a DAG1 being created. Data can be processed through DAG1, leading to table updates. Now assume that the user wants to compute a few more tables. The user can run a few more lines of code CODE2, which use variables computed in CODE1. The execution of CODE2 leads to a change in the DAG. As a simple example, assume that the first 3 lines in FIG. 5A are executed. The user could come along later and execute line 4, which would modify the DAG data structure (i.e., adding X). Also, some implementations can permit other programs to listen to changes from a node representing a data object (e.g., table or non-table object).

In some implementations, when a table changes, an application programming interface (API) can specify, for example, rows where add, modify, delete, or reindex (AMDR) changes were made. A reindex is a change in which a row is moved but the value contained in the row is not modified. The API can also provide a mechanism to obtain a value prior to the most recent change. When the DAG is processed during the refresh, the AMDR info on "upstream" data objects (e.g., tables, etc.) or nodes can be used to compute changes in "downstream" data objects or nodes. In some implementations, the entire DAG can be processed during the refresh cycle.

In general, a DAG can be comprised of a) dynamic nodes (DN); b) static nodes (SN); and c) internal nodes (IN) that can include nodes with DN and/or SN and/or IN as inputs.

DNs are nodes of the graph that can change. For example, DN can be data sources that update as new data comes in, DN could also be timers that trigger an event based on time intervals. In other examples, DN could also be MySQL monitors, specialized filtering criteria (e.g., update a "where" filter only when a certain event happens). Because these nodes are "sources", they may occur as root nodes in the DAG. At the most fundamental level, DN are root DAG nodes which change (e.g., are "alive").

SNs are nodes of the DAG that do not change. For example, historical data does not change. IN are interior nodes of the DAG. The state of an IN can be defined by its inputs, which can be DN, SN, and or IN. If all of the IN inputs are "static", the IN will be static. If one or more of the IN inputs is "dynamic", the IN will be dynamic. IN can be tables or other data structures. For example, a "listener IN" can permit code to listen to a node of the DAG. A listener node or associated listener monitoring code can place (or "fire") additional events (or notifications) into a priority queue of a DAG.

In general, a DAG can be composed of static and/or dynamic subgraphs. In some implementations, update processing occurs on dynamic subgraphs (because static subgraphs are not changing). In some such implementations, only dynamic nodes are in the DataMonitor loop. For Tables, change notification messages such as, for example, AMDR messages can be used for communication within the DAG.

When query code is executed, the DAG is created or modified. As part of this process, the system records the order in which the DAG nodes were constructed in. This "construction ordering" can be used to determine the order that nodes are processed in the DAG.

For example, consider:
a=db.i( . . . ), where a is a dynamic node (or DN)
b=a.where("A=1")
c=b.where("B=2")
d=c join(b)

Assume (a) has changes to be processed during a refresh cycle. The order of processing will be (a). (b), (c), and then (d).

When (d) is processed, it will process input changes from both (b) and (c) before creating AMDRs notification messages for (d). This ordering prevents (d) from creating more than one set of AMDRs per input change, and it can help ensure that all AMDRs are consistent with all data being processed for the clock cycle. If this ordering were not in place, it may be possible to get multiple ticks per cycle and some of the data can be inconsistent. Also, the ordering can help ensure that joins produce consistent results.

In some examples, a single data source is used more than once (i.e., has two or more child nodes in the DAG).

It will be appreciated that the implementations discussed above can use any update message format and are not limited to AMDR messages.

In some implementations, refresh processing of a DAG such as those shown in FIGS. 5B, 5C, 6A, 6B, 7, 8, and 12 can be performed generally as disclosed in U.S. patent application Ser. No. 15/154,975, entitled "COMPUTER DATA SYSTEM DATA SOURCE REFRESHING USING AN UPDATE PROPAGATION GRAPH" and filed on May 14, 2016 (hereinafter the '975 application), which is hereby incorporated by reference herein in its entirety as if fully set forth herein. For example, refresh processing of the DAG can be performed in accordance with the data source refresh processes disclosed by FIG. 6 the '975 application and the specification of the '975 application, where the notifications delivered at 614 of FIG. 6 the '975 application include the AMDR notification received by listener 1 at 416 and the AMDR notifications propagated to dependents of table X' at 422 of FIG. 4, and can also include the update notification received at 1116 and the changes propagated at 1120 of FIG. 11 of the present disclosure and described herein.

FIG. 5C is a diagram illustrating a DAG 504 connected through two workers 1 and 2, in accordance with some implementations. Worker 1 comprises DAG 506 and Worker 2 comprises DAG 508. DAGs 506 and 508 are sub-graphs of DAG 504. In operation, worker 2 transmits data to and receives data from worker 1 to subscribe consistently to updates to table X and propagate the changes to table X through its DAG 508 in accordance with the methods shown in FIGS. 4 and 9-11 and described herein.

For example, after worker 1 receives a "subscribeConsistently( )" request from worker 2 (e.g., 408, 1108), an exported table handle (with listener) is added to the DAG as a dependent of table X (shown as "X_export" in FIG. 5C). After receiving the "subscribeConsistently( )" request, worker 1 adds a listener to its DAG 506 that links the subscription table X_export to table X. X_export supports the full suite of table operations, but executes everything except subscription requests via operating on table X to create a new result table Y (not shown), and then on table Y to create a new subscription table Y_export (not shown). X_export additionally maintains state to keep track of pending index changes and snapshot delivery for all subscribed/ subscribing clients (workers or end user clients), batched up where subscription overlap permits.

In some embodiments, a replica table such as table X' is strictly in-memory table—it keeps a full copy of the remote table X_export's index, and all snapshot data that it's currently subscribed to in sparse array-backed column sources, with redirection indexes to allow compaction and efficient changes.

Figure 6A:
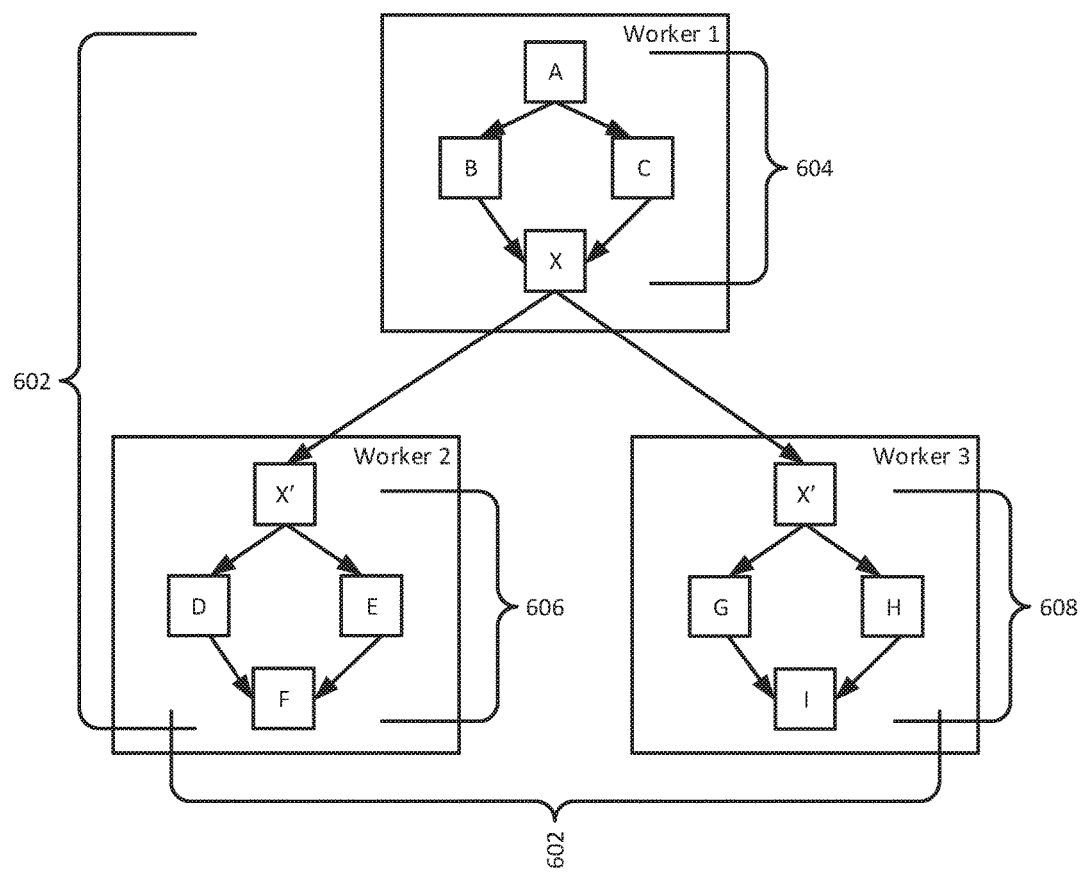
FIG. 6A is a diagram illustrating a DAG connected through three workers to determine two results on two different workers with a third worker executing a common portion used to determine each of the two results, in accordance with some implementations.

FIG. 6A is a diagram illustrating a DAG 602 connected through three workers 1, 2, and 3 to determine two results (tables F and I) on two different workers (2 and 3) with the third worker (1) executing a common portion (table X) used to determine each of the two results (tables F and I), in accordance with some implementations.

It will be appreciated that, although not shown, in some embodiments, DAG 604 can include an X_export table as a child of table X in DAG 604 and the source node to both X' tables in DAGs 606 and 608. It will be further appreciated that, in some embodiments, exported table handles similar to "X_export" are similarly added in the DAGs shown in FIGS. 6B, 7, 8, and 12.

Figure 6B:
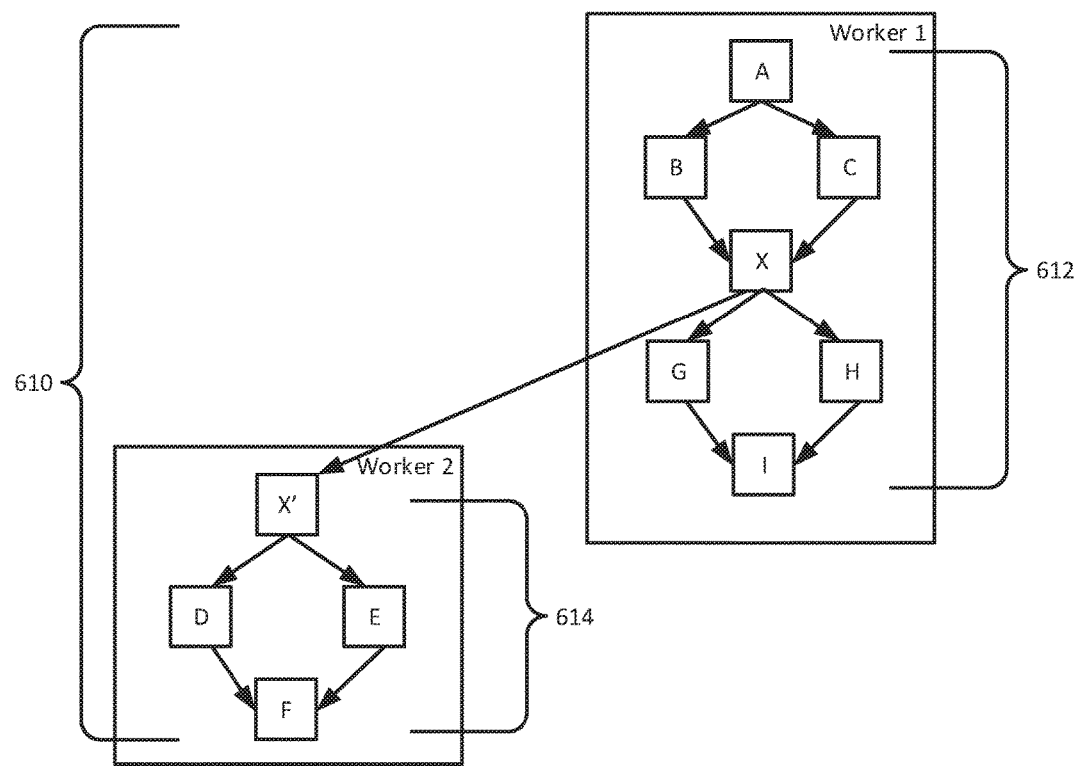
FIG. 6B is a diagram illustrating a DAG connected through two workers to calculate two results on two different workers with one of the workers executing a common portion of the two calculations, in accordance with some implementations.

FIG. 6B is a diagram illustrating a DAG 610 connected through two workers 1 and 2 to calculate two results (F and I) on two different workers with only worker 1 executing a common portion (X) of the two calculations, in accordance with some implementations. In this embodiment, DAG 610 comprises subgraphs 614 and 612.

Figure 7:
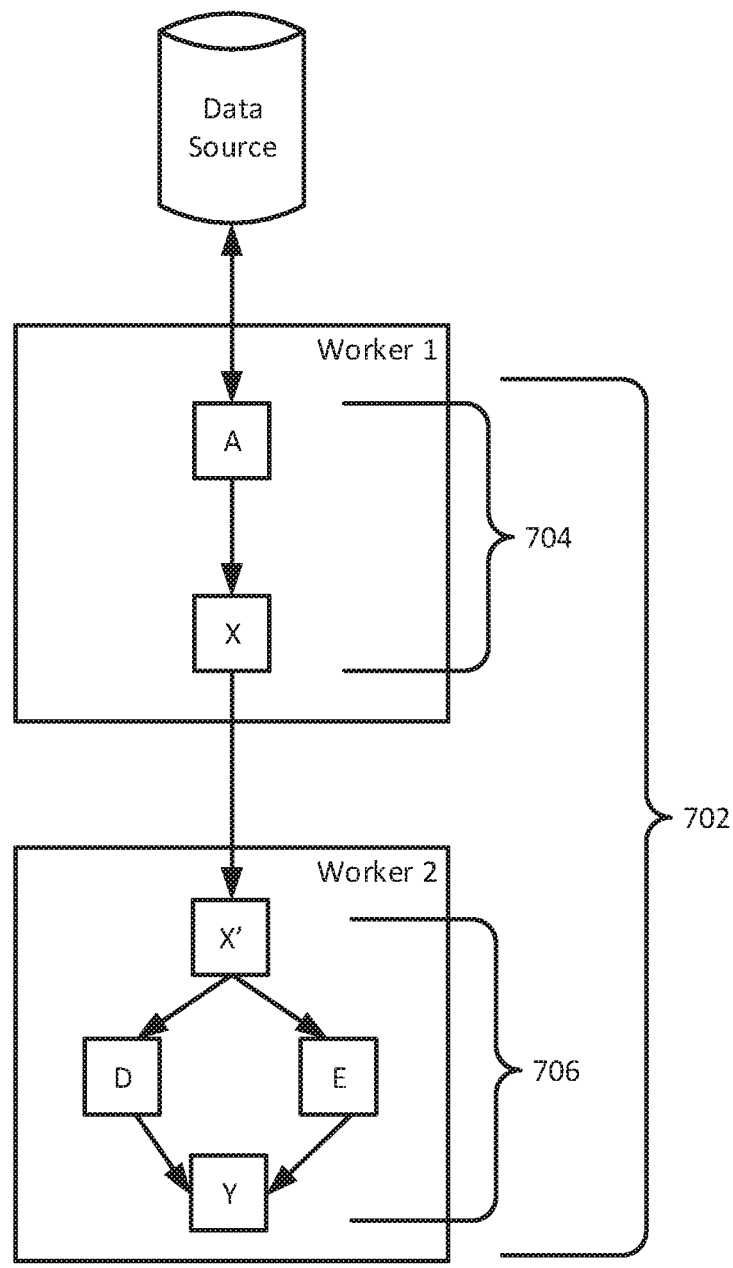
FIG. 7 is a diagram illustrating a DAG connected through two workers providing data from a data source accessible to one worker to the other worker, in accordance with some implementations.

FIG. 7 is a diagram illustrating a DAG 702 connected through two workers 1 and 2 to provide data from a data source accessible to worker 1 to the other worker 2, in accordance with some implementations. In some embodiments, worker 1 can provide worker with data from a data source that worker 2 doesn't have permission to access or physically can't access. In some embodiments, it can be more convenient for worker 2 to access data via worker 1 even if worker 2 could access the data directly (e.g., worker 2 can transmit data to/from worker 1 faster than worker 2 can transmit data to/from the data source).

Figure 8:
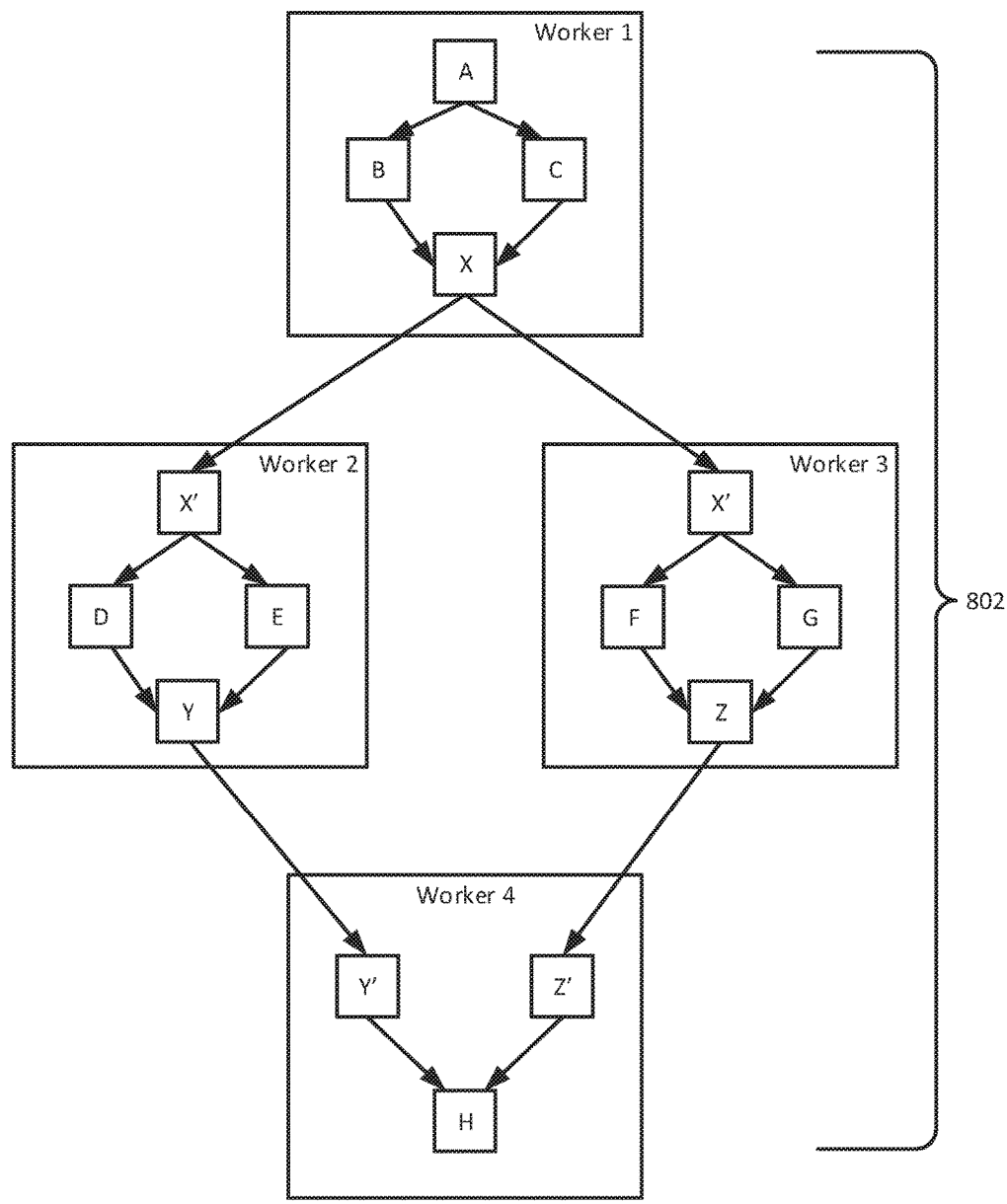
FIG. 8 is a diagram illustrating a DAG connected through four workers, in accordance with some implementations.

FIG. 8 is a diagram illustrating a DAG 802 connected through four workers 1-4, in accordance with some implementations.

Figure 12:
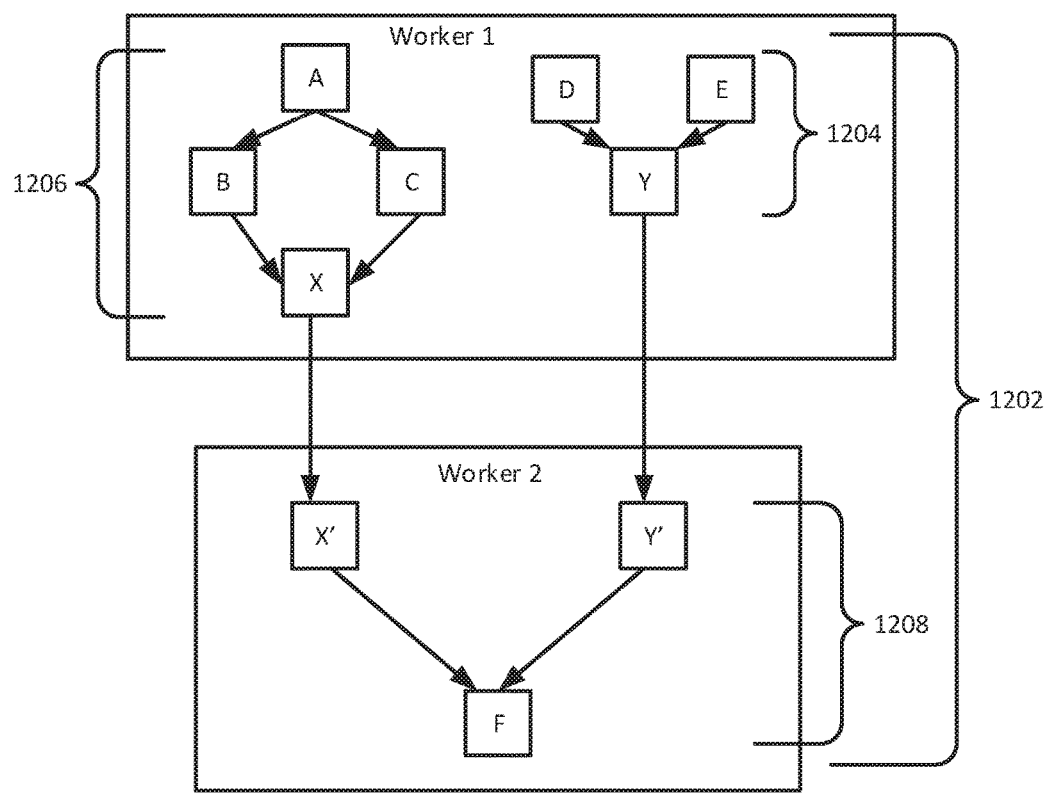
FIG. 12 is a diagram illustrating a DAG connected through two workers, in accordance with some implementations.

FIG. 12 is a diagram illustrating a DAG 1202 connected through two workers 1 and 2, in accordance with some implementations. DAG 1202 comprises DAGs 1204 and 1206 of worker 1 and DAG 1208 of worker 2.

Figure 9:
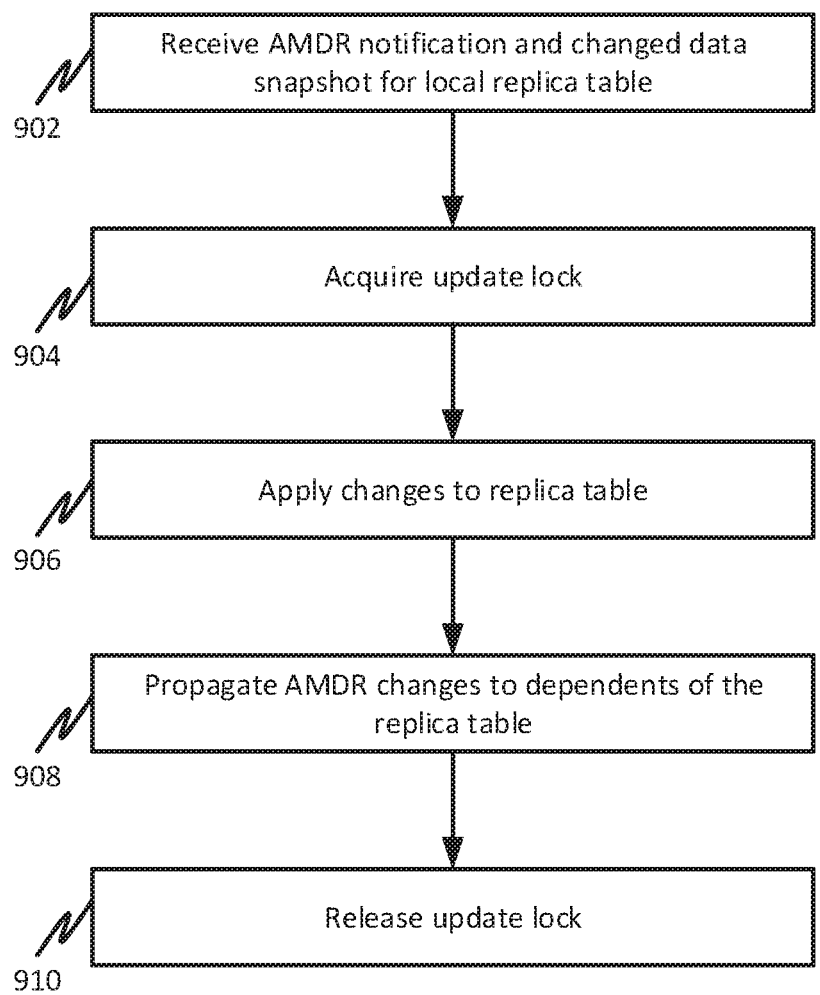
FIG. 9 is a flowchart of an example method of receiving and propagating an update through a connected DAG in accordance with some implementations.

FIG. 9 is a flowchart of an example method 900 of receiving and propagating an update through a connected DAG in accordance with some implementations. Processing begins at 902, where an AMDR notification and a changed data snapshot for a local replica table are received. Processing continues to 904.

At 904, an update lock is acquired. Processing continues to 906.

At 906, changes are applied to the replica table. Processing continues to 908.

At 908, AMDR changes are propagated to dependents of the replica table. Processing continues to 910.

At 910, the update lock is released.

It will be appreciated that 902-910 may be repeated in whole or in part. For example, 902-910 may be repeated to propagate multiple updates.

Figure 10:
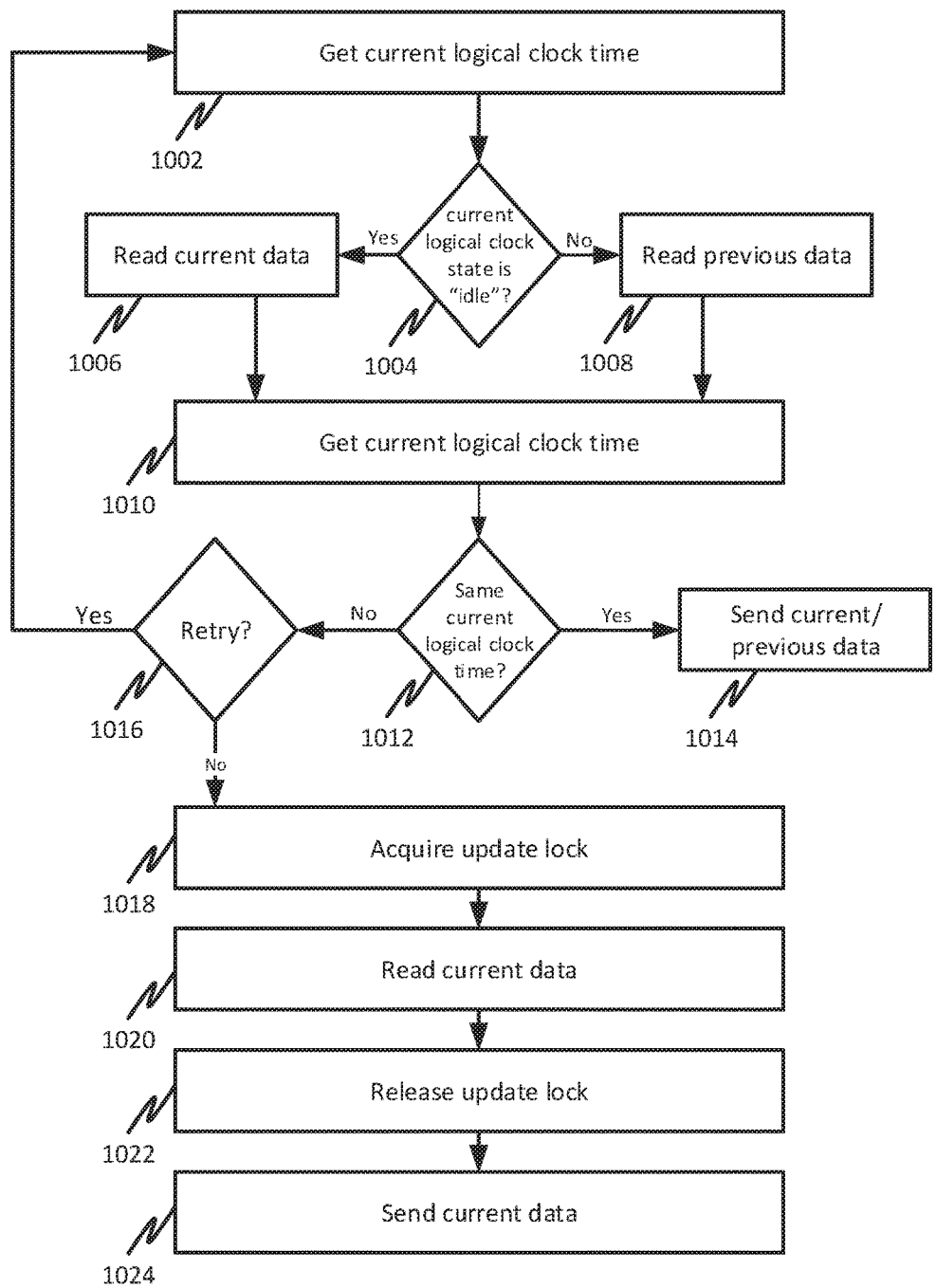
FIG. 10 is a flowchart of an example method of creating an initial data snapshot for transmission to a subscribing remote query processor, in accordance with some implementations.

FIG. 10 is a flowchart of an example method 1000 of creating an initial data snapshot for transmission to a subscribing remote query processor in accordance with some implementations. Processing begins at 1002, where the current logical clock time is determined. Processing continues to 1004.

At 1004, it is determined whether the current logical clock state is set to "idle". If so, processing continues to 1006, otherwise processing continues to 1008.

At 1006, current data is read. The current data can be the version of the data to be sent that is current for the current logical clock. Processing continues to 1010.

At 1008, previous data is read. The previous data can be the version of the data to be sent as it was just prior to the current logical clock cycle. Processing continues to 1010.

At 1010, a new current logical clock time is determined. Processing continues to 1012.

At 1012, the current logical clock time at 1002 and the new current logical clock time 1010 are compared to determine whether they are the same logical clock time. If so, locking at 1018 can be avoided and processing continues to 1014, otherwise processing continues to 1016.

At 1014, the data read at 1006/1008 is sent.

At 1016, the system determines whether to retry reading data at 1006/1008 again without locking. If so, processing continues to 1002, else processing continues 1018. Some embodiments can count the number of retries and limit the number of retries to a predetermined number (e.g., 5).

Some embodiments can determine whether to retry based on heuristics about the relative size of the subscription vs the whole table. Some embodiments can determine whether to retry based on the relative time taken in 1002-1010 (snapshot composition time) as compared to statistics on the update cycle duration that the snapshot is racing with (e.g. retrying if snapshot time is much faster than an average (e.g., exponential moving average or EMA) of update time). Some embodiments can determine whether to retry based on the estimated delay until the beginning of the next update cycle or the end of the current update cycle, relative to observed or estimated snapshot composition time. Some embodiments can determine whether to retry based on an estimated/configured frequency of data update cycles, or the snapshot interval for remote source tables.

At 1018, an update lock is acquired. Processing continues to 1020.

At 1020, current data is read. Processing continues to 1022.

At 1022, the update lock is released. Processing continues to 1024.

At 1024, the current data read at 1020 is sent.

It will be appreciated that 1002-1024 may be repeated in whole or in part. For example, 1002-1016 may be repeated to retry obtaining a consistent data read at 1006/1008 without acquiring a lock.

Figure 11:
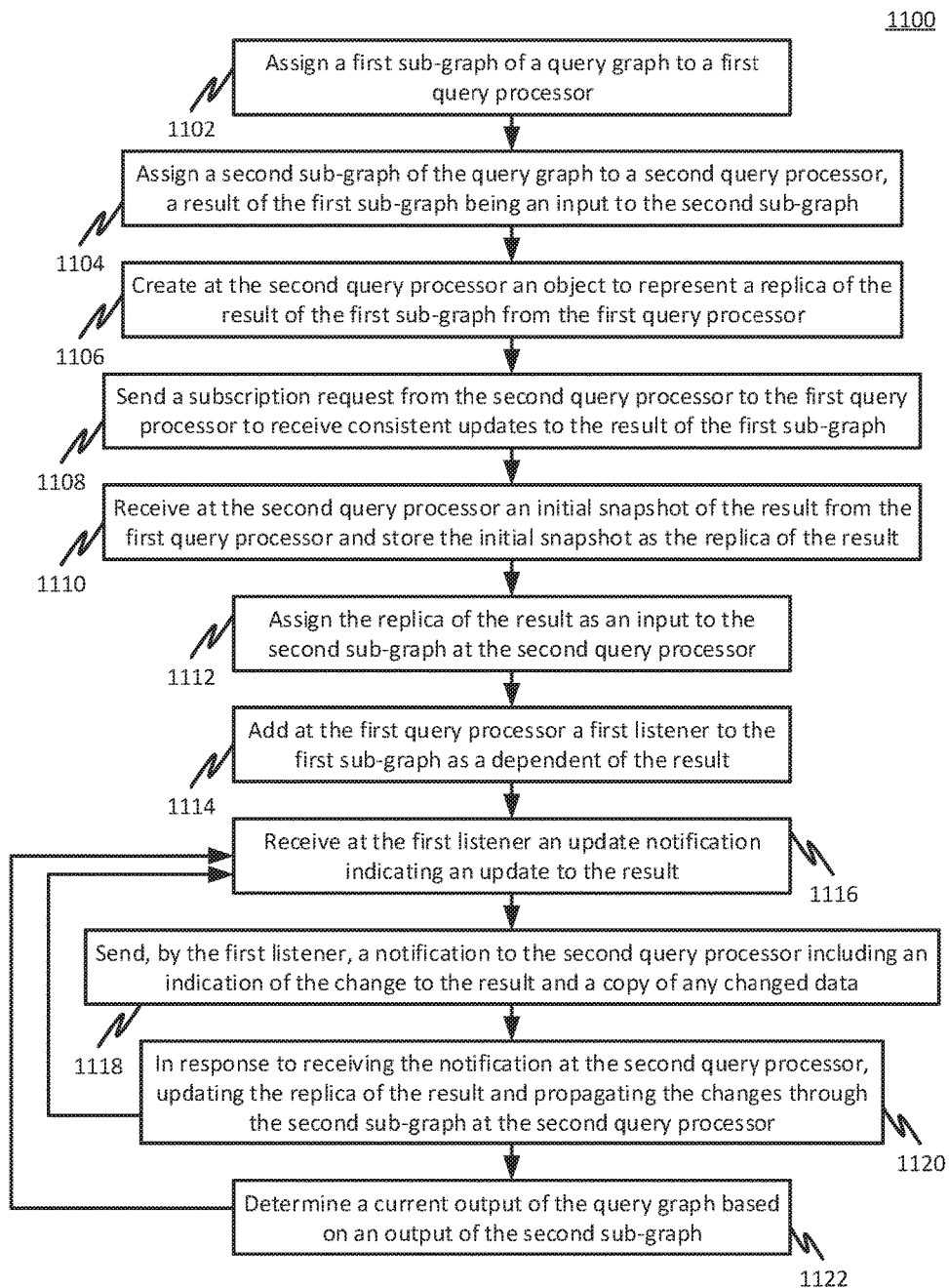
FIG. 11 is a flowchart of an example method of connecting a query DAG through multiple remote query processors, in accordance with some implementations.

FIG. 11 is a flowchart of an example method 1100 of connecting a query DAG through multiple remote query processors in accordance with some implementations. Processing begins at 1102, where a first sub-graph of a query graph is assigned to a first query processor. Processing continues to 1104.

At 1104, a second sub-graph of the query graph is assigned to a second query processor, a result of the first sub-graph being an input to the second sub-graph. Processing continues to 1106.

In some embodiments, assignment of sub-graphs can be done manually by a user. For example, a user who is composing a complex query can implements interdependent sub-queries and manually assigns them to different workers/clients.

In some embodiments, the sub-graphs can be dynamically assigned. For example, a user can reference a table resident on a worker (e.g., via a GUI) and creates a local sub-query dependent on the remote table subscription via actions (e.g., actions undertaken in a GUI widget). In such embodiments, the system can examine the query and update performance logs produced the system in order to automatically identify points at which a query should be broken into sub-queries, based on performance consideration (e.g., CPU-usage or RAM-usage considerations). The system can then connect the identified sub-queries through different query processors to improve performance of the system and/or the query. In some such embodiments, the system operates a performance data processing architecture to capture and log query performance data and analyze such data to identify points at which a query should be broken into subqueries, such as, for example, the performance data processing architecture and operation thereof disclosed in application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016 (hereinafter the '980 application), which is hereby incorporated by reference herein in its entirety as if fully set forth herein. For example, some such embodiments can operate a performance data processing architecture as disclosed at FIG. 10 of the '980 application and the specification of the '980 application, and automatically identify points at which a query should be broken into sub-queries, based on performance consideration (e.g., CPU-usage or RAM-usage considerations) based on the analysis performed at 1018 and/or 1020 of FIG. 10 of the '980 application.

At 1106, an object is created at the second query processor to represent a replica of the result of the first sub-graph from the first query processor. Processing continues to 1108.

At 1108, a subscription request is sent from the second query processor to the first query processor to receive consistent updates to the result of the first sub-graph. Processing continues to 1110.

At 1110, an initial snapshot of the result is received at the second query processor from the first query processor and the initial snapshot is stored at the second query processor as the replica of the result. Optionally, the second query processor can be configured to propagate AMDR "add" messages through its DAG after receiving and storing the initial snapshot. Processing continues to 1112.

At 1112. the replica of the result is assigned as an input to the second sub-graph at the second query processor. Processing continues to 1114.

At 1114, a first listener is added at the first query processor to the first sub-graph as a dependent of the result. Processing continues to 1116.

At 1116, an update notification indicating an update to the result is received at the first listener. Processing continues to 1118.

At 1118, the first listener sends a notification to the second query processor including an indication of the change to the result and a copy of any changed data. Processing continues to 1120.

At 1120, responsive to receiving the notification at the second query processor, the replica of the result is updated at the second query processor and the changes are propagated through the second sub-graph at the second query processor. Processing continues to 1122.

At 1122, a current output of the query graph is determined based on an output of the second sub-graph.

It will be appreciated that, although not shown, the subscribing second query processor can cancel their subscription to stop receiving updates from the first query processor.

It will also be appreciated that 1102-1122 may be repeated in whole or in part. For example, 1116-1122 may be repeated to propagate updates through the sub-subgraphs and update the output of the second sub-graph.

Although references have been made herein to tables and table data, it will be appreciated that the disclosed systems and methods can be applied with various computer data objects to, for example, provide flexible data routing and caching for such objects in accordance with the disclosed subject matter. For example, references herein to tables can include a collection of objects generally, and tables can include column types that are not limited to scalar values and can include complex types (e.g., objects).

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA). a graphics processing unit (e.g., GPGPU or GPU) or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM. EEPROM, RAM. flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules. sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, GP, GPU, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for computer data distribution architecture connecting an update propagation graph through multiple remote query processors.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985. entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009. entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

Application Ser. No. 15/351,429, entitled "QUERY TASK PROCESSING BASED ON MEMORY ALLOCATION AND PERFORMANCE CRITERIA" and filed in the United States Patent and Trademark Office on Nov. 14, 2016, is hereby incorporated by reference herein in its entirety as if fully set forth herein.

Application Ser. No. 15/813,112, entitled "COMPUTER DATA SYSTEM DATA SOURCE REFRESHING USING AN UPDATE PROPAGATION GRAPH HAVING A MERGED JOIN LISTENER" and filed in the United States Patent and Trademark Office on Nov. 14, 2017, is hereby incorporated by reference herein in its entirety as if fully set forth herein.

Application Ser. No. 15/813,142, entitled "COMPUTER DATA SYSTEM DATA SOURCE HAVING AN UPDATE PROPAGATION GRAPH WITH FEEDBACK CYCLICALITY" and filed in the United States Patent and Trademark Office on Nov. 14, 2017, is hereby incorporated by reference herein in its entirety as if fully set forth herein.

Application Ser. No. 15/813,119, entitled "KEYED ROW SELECTION" and filed in the United States Patent and Trademark Office on Nov. 14, 2017, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer database system comprising:
one or more processors;
computer readable storage coupled to the one or more processors, the computer readable storage having stored thereon instructions that, when executed by the one or more processors, cause the one or more processors to perform operations including:
receiving a query;
parsing the query and in response to said parsing creating a query graph based on the query;
assigning a first sub-graph of the query graph to a first query processor;
assigning a second sub-graph of the query graph to a second query processor, a result of the first sub-graph being an input to the second sub-graph;
creating, at the second query processor, an object to represent a replica of the result of the first sub-graph from the first query processor;
sending a subscription request from the second query processor to the first query processor to receive consistent updates to the result of the first sub-graph;
receiving, at the second query processor, an initial snapshot of the result from the first query processor;
storing the initial snapshot as the replica of the result;
assigning the replica of the result as an input to the second sub-graph at the second query processor;
adding at the first query processor a first listener to the first sub-graph as a dependent of the result;
receiving, at the first listener, an update notification indicating an update to the result;
sending, by the first listener, a notification to the second query processor including an indication of the change to the result and a copy of any changed data;
responsive to receiving the notification at the second query processor, updating the replica of the result and propagating the changes through the second sub-graph at the second query processor; and
determining a current output of the query graph based on an output of the second sub-graph.

2. The computer database system of claim 1, wherein the query graph is a directed acyclic graph.

3. The computer database system of claim 1, wherein the first and second sub-graphs are directed acyclic graphs.

4. The computer database system of claim 1, wherein the update notification includes at least one selected from a group consisting of a data add notification, a data modify notification, a data delete notification and a data reindex notification.

5. The computer database system of claim 1, wherein the notification includes at least one selected from a group consisting of a data add notification, a data modify notification, a data delete notification and a data reindex notification.

6. A method comprising:
assigning a first sub-graph of a query graph to a first query processor;
assigning a second sub-graph of the query graph to a second query processor, a result of the first sub-graph being an input to the second sub-graph;
creating, at the second query processor, an object to represent a replica of the result of the first sub-graph from the first query processor;
sending a subscription request from the second query processor to the first query processor to receive consistent updates to the result of the first sub-graph;
assigning the replica of the result as an input to the second sub-graph at the second query processor
adding at the first query processor a first listener to the first sub-graph as a dependent of the result;
receiving, at the first listener, an update notification indicating an update to the result;
sending, by the first listener, a notification to the second query processor including an indication of the change to the result and a copy of any changed data;
responsive to receiving the notification at the second query processor, updating the replica of the result and propagating the changes through the second sub-graph at the second query processor; and
determining a current output of the query graph based on an output of the second sub-graph.

7. The method of claim 6, further comprising: receiving a query; parsing the query; and in response to said parsing, creating the query graph based on the query.

8. The method of claim 6, further comprising:
receiving, at the second query processor, an initial snapshot of the result from the first query processor, the initial snapshot being sent in response to the subscription request; and
storing the initial snapshot as the replica of the result.

9. The method of claim 6, wherein the query graph is a directed acyclic graph.

10. The method of claim 6, wherein the first and second sub-graphs are directed acyclic graphs.

11. The method of claim 6, wherein the update notification includes at least one selected from a group consisting of a data add notification, a data modify notification, a data delete notification and a data reindex notification.

12. The method of claim 6, wherein the notification includes at least one selected from a group consisting of a data add notification, a data modify notification, a data delete notification and a data reindex notification.

13. A nontransitory computer readable medium having stored thereon software instructions that, when executed by one or more processors, cause the one or more processors to perform operations including:
creating, at the second query processor, an object to represent a replica of the result of the first sub-graph from the first query processor;
sending a subscription request from the second query processor to the first query processor to receive consistent updates to the result of the first sub-graph;
assigning the replica of the result as an input to the second sub-graph at the second query processor
adding at the first query processor a first listener to the first sub-graph as a dependent of the result;
receiving, at the first listener, an update notification indicating an update to the result;
sending, by the first listener, a notification to the second query processor including an indication of the change to the result and a copy of any changed data;
responsive to receiving the notification at the second query processor, updating the replica of the result and propagating the changes through the second sub-graph at the second query processor; and
determining a current output of the query graph based on an output of the second sub-graph.

14. The nontransitory computer readable medium of claim 13, the operations further comprising: assigning a first sub-graph of a query graph to a first query processor; and assigning a second sub-graph of the query graph to a second query processor, a result of the first sub-graph being an input to the second sub-graph.

15. The nontransitory computer readable medium of claim 13, the operations further comprising: receiving a query; parsing the query; and in response to said parsing creating the query graph based on the query.

16. The nontransitory computer readable medium of claim 13, the operations further comprising:
receiving, at the second query processor, an initial snapshot of the result from the first query processor, the initial snapshot being sent in response to the subscription request; and
storing the initial snapshot as the replica of the result.

17. The nontransitory computer readable medium of claim 13, wherein the query graph is a directed acyclic graph.

18. The nontransitory computer readable medium of claim 13, wherein the first and second sub-graphs are directed acyclic graphs.

19. The nontransitory computer readable medium of claim 13, wherein the update notification includes at least one selected from a group consisting of a data add notification, a data modify notification, a data delete notification and a data reindex notification.

20. The nontransitory computer readable medium of claim 13, wherein the notification includes at least one selected from a group consisting of a data add notification, a data modify notification, a data delete notification and a data reindex notification.

\* \* \* \* \*